Oct. 31, 1961  R. ORSINI  3,006,257
METHOD FOR PRODUCING BAGS AND THE LIKE CONTAINERS
OF THERMO-WELDABLE MATERIAL THROUGH WELDING OF
ELEMENTARY COMPONENT PARTS
Filed Oct. 1, 1957  3 Sheets-Sheet 1
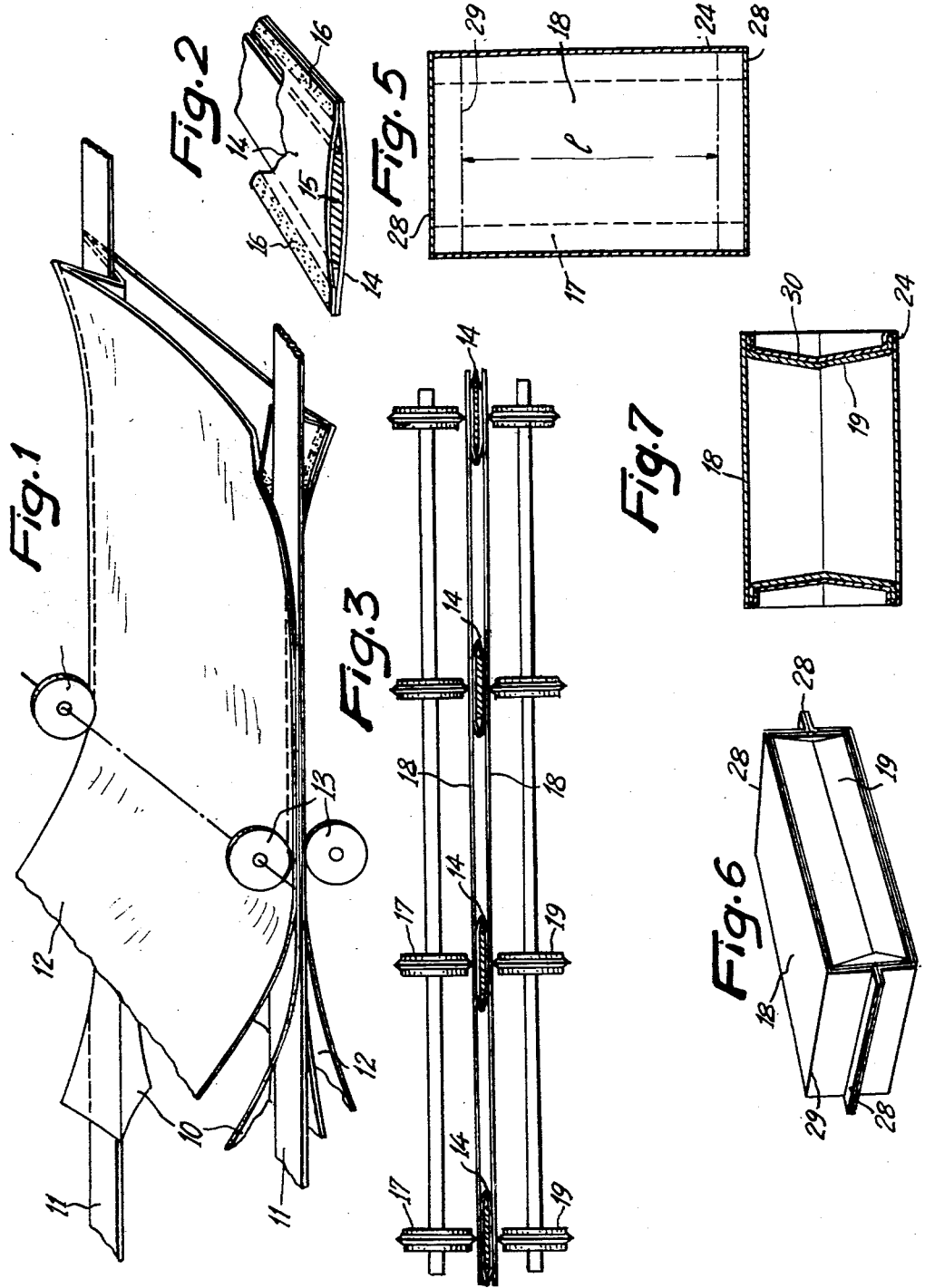

Oct. 31, 1961 R. ORSINI 3,006,257
METHOD FOR PRODUCING BAGS AND THE LIKE CONTAINERS
OF THERMO-WELDABLE MATERIAL THROUGH WELDING OF
ELEMENTARY COMPONENT PARTS
Filed Oct. 1, 1957 3 Sheets-Sheet 3
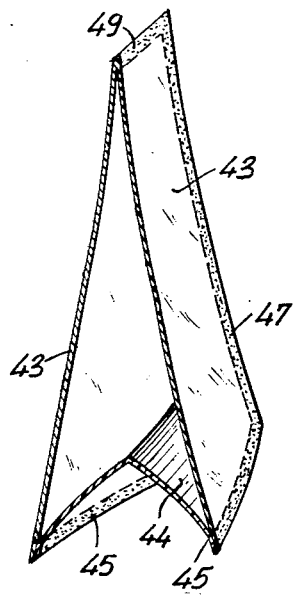
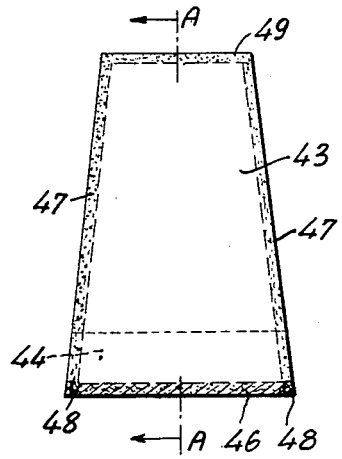
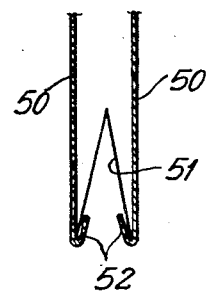
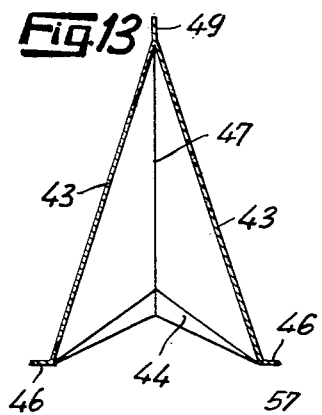
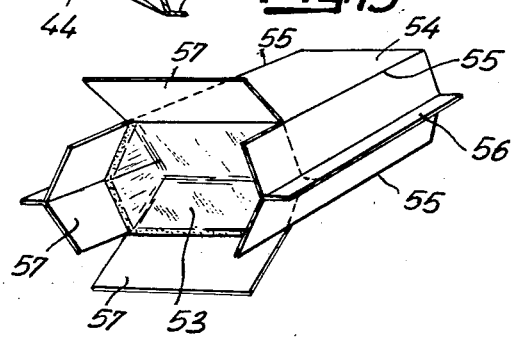

United States Patent Office 3,006,257
Patented Oct. 31, 1961

3,006,257
METHOD FOR PRODUCING BAGS AND THE LIKE CONTAINERS OF THERMO-WELDABLE MATERIAL THROUGH WELDING OF ELEMENTARY COMPONENT PARTS
Rene Orsini, Casablanca, Morocco, assignor to S. A. Plastus, Fribourg, Switzerland, a corporation of Switzerland
Filed Oct. 1, 1957, Ser. No. 687,543
Claims priority, application France Oct. 2, 1956
6 Claims. (Cl. 93—35)

My invention has for its object the production of bags, cases and the like containers of thermo-weldable material through the welding of elementary component parts. It is more particularly applicable to the execution of collapsible accordion or bellow-shaped bags and the like deformable flat-bottomed cases assuming substantially parallelopipedic shapes. It is furthermore particularly applicable to a method for executing a bellow-shaped sheath adapted to produce the desired final article through transverse welding and cutting operations.

Hitherto bellow-shaped bags were executed starting from sheaths the opposite terminal sides of which were turned back on special machines and this resulted in that it was necessary to have stocks of variously sized sheaths to correspond to each size of bags. Furthermore, the bags thus executed have a tendency to return to their original cylindrical shape and lastly the bags were of necessity made throughout their extent of the same basic material such as polyethylene or the like.

According to my improved method, the bellow-shaped section of thermo-weldable material is welded along its edges to the edges of the sheets forming the terminal surfaces of the bag and, more particularly, the welding is performed by a fitting of the bellow shaped section between the two sheets with the insertion between the cooperating flanges of the bellow-shaped section of a ply of a non-weldable material while the welds to be made on the two edges of said bellow-shaped section are produced simultaneously.

The ply of non thermo-weldable material may be constituted by a sheet of paper or the like or by a coat of a lubricant or of a varnish having a silicone base.

Consequently, for the execution of sheaths of the single bellow-type, I fold into V-shape, with the insertion of an intermediate paper or the like sheet, strips of thermoplastic material, the breadth of which is equal to that of the bellow-shaped section or wall to be obtained and these strips are applied longitudinally over the inner surfaces of further strips adapted to form the terminal nonfolding surfaces of the bag; the line of fold of the first strip is directed inwardly and the welding is performed along the edges of the stack of superposed strips, which leads to a welding between the edge of each strip forming a terminal surface of the bag and the edge of the corresponding flange of the V-shaped strip; the two flanges of a same V-shaped strip are not welded together by reason of the presence of the intermediate ply. The bag is finished by providing transverse closing welds on the sheath obtained after removal of the intermediate plies.

It is possible through this method to execute bellow-shaped bags the walls of which are of different materials; for instance, the terminal opaque surfaces may be made of paper coated with polyethylene while the lateral transparent surfaces are made of polyethylene. Any other technically possible association of materials may of course be obtained. The bags are provided with flanges which are reinforced by the welds which have furthermore for their result an inward shifting of the folds.

It is apparent that the manufacturing problems are simplified since I start no longer from a sheath but from a film or sheet, and in particular it is possible to resort to materials which cannot be obtained in sheath formation as in the case of paper coated with plastic material or of a cellulosic film coated with polyethylene or the like.

It is furthermore possible to produce simultaneously and continuously bellow-shaped sheaths extending over a considerable breadth. To this end I form, by welding together along their edges two narrow strips, flat sheaths enclosing an intermediate sheet of a material which is not thermo-weldable and these flat sheaths adapted to form the bellows are set in parallelism between two broad films of thermo-weldable material while they are spaced by the breadth required for the bags after which a welding is performed through the stack obtained along the medial areas of the flat sheaths and a cut is made through the medial line of these welds.

The above-mentioned compound materials show generally excellent mechanical properties, chiefly as concerns rigidity, which properties are better than those of films made of pure plastic material. It is possible, through the execution of my method, to produce bags or cases of a parallelopipedic shape the rigidity of which is obtained through the compound materials used, chiefly those having a base of paper or cardboard, and which are perfectly fluidtight. To this end, I provide a bellow-shaped sheath, the front and rear surfaces of which are made of a compound material while the transverse bellow-shaped sections are made of a film of thermo-weldable plastic material, which allows executing perfectly fluidtight transverse welds and the bellow-shaped sections are lined over a length corresponding to the height of the bag or case by a bellow-shaped section made of compound material. This operation may be executed in various manners. It is also possible to form the intermediate layer or ply by means of the non thermo-weldable surface of the compound material, the coated surface of the latter being welded to the inner surface of the free edge of the bellow-shaped section of thermo-plastic material, which leads to the obtention of a reinforced weld.

My invention has also for its object by way of a novel article of manufacture flat welded sheaths with a non thermo-weldable inset, bellow-shaped sheaths obtained in accordance with my improved method including more particularly terminal surfaces of compound material and also the bags and packages obtained in accordance with my invention. The latter covers in particular the bags constituted by two surfaces of compound material welded after closing along three edges while a bellow-shaped section of plastic material welded in accordance with my improved method closes the fourth side of the arrangement and the lateral edges of said section are secured through the welding with the lateral welds of the bag.

Further features of my invention and details of its execution will appear in the reading of the following disclosure describing various embodiments of my improved method, reference being made to the accompanying drawings, wherein:

FIG. 1 is a perspective view partly torn off illustrating a simple embodiment of my method for producing bellow-shaped bags.

FIG. 2 is a perspective view of a sheath adapted to constitute the bellow-shaped sections of two bags formed adjacent each other during the continuous execution of my improved method according to a second embodiment thereof.

FIG. 3 is a sectional view of a machine, showing the manner of using the sheath illustrated in FIG. 2.

FIG. 5 is a plan view of a flat bag obtained starting from the bellow-shaped sheaths according to my invention.

FIG. 6 is a perspective view of the bag when filled or inflated.

FIG. 7 is a sectional view of the bag shown in FIG. 6, with a ply of compound material reinforcing the bellows.

FIG. 11 is a sectional perspective view of a bag having a bellow-shaped section only at one end.

FIG. 12 is an elevational view of the bag shown in FIG. 11, but in its flat condition.

FIG. 13 is a sectional view through line A—A of the bag illustrated in FIG. 12 in its open condition, with a slight modification.

FIG. 14 illustrates a modification in the execution of the welds.

FIG. 15 is a perspective view of the bottom of a package forming a case in accordance with a modification.

Figure 4:
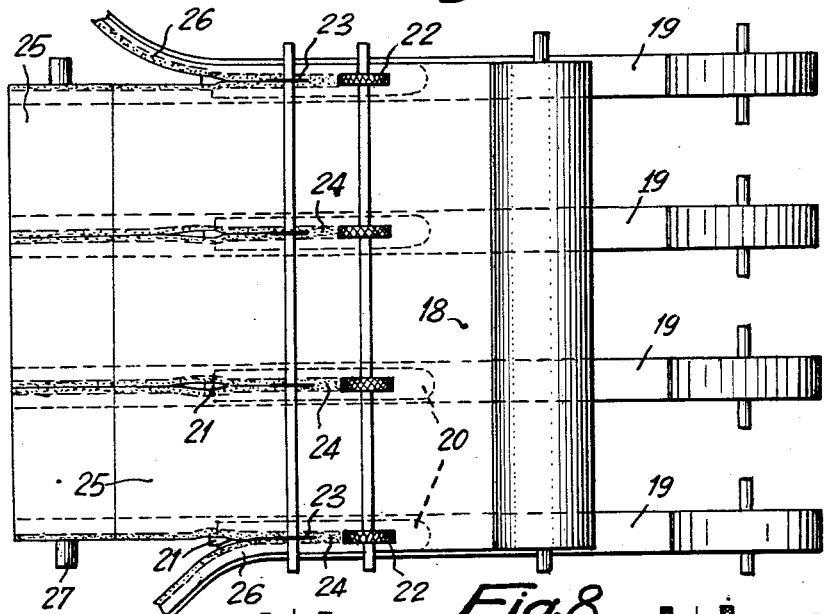
FIG. 4 is a plan view of a machine similar to FIG. 3, resorting however to sheaths of the type commonly sold in the trade.

The principle of the method is illustrated in FIG. 1 which shows the folding into V-shape of two strips 10 of thermo-weldable material with the insertion inside their folds of intermediate plies or sheets 11 made for instance of paper, the breadth of said intermediate sheets being equal at least to the breadth of the flanges formed by the folded strips 10.

Said folded strips 10 are fitted between further strips 12 of a thermo-plastic material liable to be used together with the material forming the strips 10 so that the edges of the strips 10 and 12 may register with each other, the medial folds of the V-shaped strips 10 being directed inwardly of the arrangement.

The edges of the system thus obtained are fed between the heating rolls 13 or the like. The welds are thus formed between the lateral edges of the strips 10 and 12, but the presence of the intermediate sheets 11 cuts out any welding between the flanges of either strip 10. It is then sufficient to form on the bellow-shaped sheath thus obtained transverse welds with a view to closing the bags.

For the execution in a continuous manner and in mass production, I proceed as illustrated in FIGS. 2 and 3. There are produced sheaths through a superposition of two narrow strips 14 made of thermo-plastic material and between which is fitted an insert 15 which is narrower than the strips and which is made of paper for instance. The two strips 14 are welded together along their cooperating edges at 16 so as to produce an elementary sheath enclosing the insert 15.

In the example illustrated in FIG. 3 four such sheaths 14 are fed in parallelism into the space separating two superposed films 18 of thermo-plastic material, the spacing between the medial lines of two successive sheaths 14 being equal to the breadth of the bellow-shaped bags to be obtained. The arrangement thus constituted passes between heating rolls 17 which act in registry with the medial areas of the sheaths 14. This leads to thermic welds between the upper surfaces of the sheaths 14 and the upper film 18 on the one hand, and between the lower surfaces of the sheaths 14 and the lower film 18 on the other hand. It is then sufficient to cut the compound sheet thus obtained in registry with these longitudinal welds with a view to obtaining three bellow-shaped sheaths starting from which it is possible to obtain the actual bags through mere transverse welds.

It is possible by proceeding as illustrated in FIG. 4 to cut out the preliminary stage leading to the execution of sheaths 14. Starting from sheaths 19 of the type sold in the trade, I use a machine including very thin and rigid blades 20 secured to the working table and extending in parallelism with the direction of progression of the film 18, as provided by thin supports 21 arranged perpendicularly to the table. The elementary sheaths 19 are fitted over said blades while the films 18 are located above and below them. Heating rolls 22 are positioned to either side of the stack constituted by the films 18, the sheaths 19 and the blades 20, in registry with said blades 20, so as to weld together the surfaces of the sheaths 19 and the films 18 located respectively above and below the blades. Cutting rolls 23 acting through gates provided in said blades 20 cut subsequently through the weld 24 thus provided so as to separate the bellow-shaped sheaths 25 formed and the lateral waste strips 26. The sheaths 25 are wound over the receiving cylinder 27.

It is thus possible to produce in particular sheaths the front and rear surfaces of which are made of compound material while the bellow-shaped sections are made of a thermo-plastic material such as polyethylene. To bring the execution of the bag to an end, transverse welds 28 (FIG. 5) are formed on said sheaths both across the compound material and across the two flanges of the bellows made of plastic material, which cuts out any possibility of a leak. I initiate at 29 in the surface of compound material the folds adapted to give the bag a parallelopipedic shape and the arrangement obtained is cut to the desired length. The finished and filled bag assumes the shape illustrated in FIG. 6.

It is also possible to conceal and protect at least partly the bellow-shaped section 19 made of polyethylene by welding over the breadth of the welds 24 the edges of compound strips 30 (FIG. 7) of compound material the length of which is shown at *l* in FIG. 5.

Figure 8:
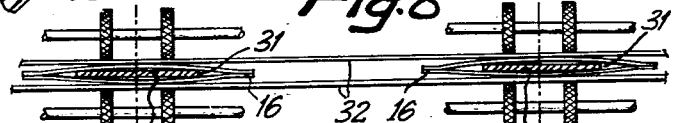
FIG. 8 is a sectional view corresponding to a fraction of FIG. 3 of a machine adapted to execute a second type of bellow-shaped bag the terminal walls of which are made of compound material.
Figure 9:
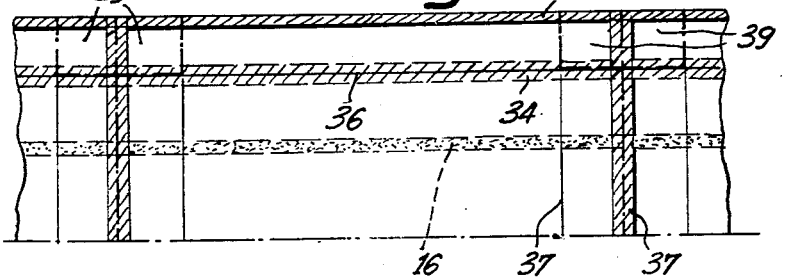
FIG. 9 is a half plan view of a sheath executed as shown in FIG. 8, the transverse welds and the cuts being shown in said FIG. 9.
Figure 10:
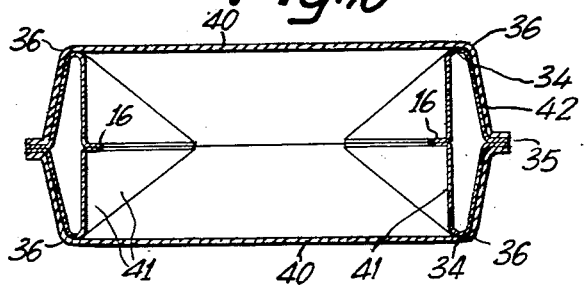
FIG. 10 is a cross-section corresponding to FIG. 7 of a bag obtained in accordance with the method illustrated in FIGS. 8 and 9.

In order to cut out the difficult operation consisting in positioning and welding the edges of such strips 30, I proceed preferably as illustrated in FIGS. 8 to 10. I start as shown in FIG. 8 from sheaths 31 similar to the sheaths 14 already referred to, but the breadth of which is equal to twice the development of a bellow-shaped section, i.e. it is double that of the sheath of FIG. 3. These sheaths are fitted between two sheets of compound material 32 constituted for instance by kraft paper coated with polyethylene, the coated side engaging the sheath. The spacing between the axes of the successive sheaths 31 is equal to one half the breadth of finished bag, i.e. to the breadth of its terminal surface increased by that of a bellow-shaped section and of two welds. I then produce through the heating rolls 33 longitudinal welds 34 along the sheaths at the rate of two welds on each sheath. The two flat sheets between which the sheaths are inserted and which contain the separating strips are thus first welded together at a distance from the axis of the sheath corresponding to one half of the breadth of the bellow-shaped bag, i.e. to one quarter of the breadth of the sheath. This being done, a cut is provided axially of the sheath, the separating strips are removed and the edges of the two outer films are wedged together, together with the two cut edges of the sheath. I obtain thus bellow-shaped sheaths outer edges of which on the outside of the bellow-shaped sections are constituted by a layer of compound material superposed over a layer of polyethylene. I weld along their edges the four layers by means of a weld 35 (FIG. 10). The bag is finished by drawing on the kraft paper lines of fold both longitudinally at 36 and transversely at 37, the transverse welds being produced at 38 and cut throughout the length along the middle of said welds while the corners 39 for instance in alignment with the lines drawn at 36 and 37 are also cut off. Gates may be provided if required in the lateral surfaces.

The bag obtained and shown in FIG. 10 is fluidtight between the surfaces 40 and the inner wall 41 of the bellow-shaped section. The outer wall 42 of the latter forms the outer wall of the bag with the edges of the compound sheets whereby I obtain a mechanical protection which provide the desired rigidity and homogeneous appearance of the bag.

Turning to FIGS. 11 to 13, the bags illustrated therein include two walls of compound material 43 the coated surfaces of which face each other. A V-shaped element 44 of thermo-plastic material is fitted between cooperating edges of said walls to one side thereof and is welded in accordance with the above disclosed method through the application along the inner side of a V-shaped element 44 of a varnish having a silicone base, the surfaces 45 being welded together. This provides a weld as shown at 46 which makes the V-shaped element 44 rigid with the two surfaces of compound material 43 while the two flanges of said element 44 remain free with reference to each other. The weld 47 provided along the adjacent edges of the compound surfaces ensure fluid-tightness at the bottom of the bag and make the four layers or thicknesses rigid with one another, except along the surfaces 48 on the inside of the V-shaped element. This allows turning outwardly if required the surface of the welds 46 as illustrated in FIG. 13 so as to allow the V-shaped element to stand more readily on a support. The bag is then closed for instance after its filling by a final weld at 49. In the embodiments which have been described hereinabove, it has been proposed to introduce between the flanges of the V-shaped section or element a sheet or similar layer of a nonthermo-weldable material which is independent of the welded material. But when as illustrated in FIG. 14, two sheets of a compound material 50 are welded over a thermo-plastic V-shaped element 51, it is possible to fold back over the inside of said element the edges 52 of the sheets of compound material. The nonthermo-plastic surfaces of the edges 52 face each other and play the same part as the thicknesses or layers of non thermo-weldable material and a double weld is produced between the inner and outer surfaces of the V-shaped element on the one hand and the edge 52 of the compound material and the inner surface of the wall 50 of the compound material respectively on the other hand.

The modification illustrated in FIG. 15 relates to a particular embodiment of the bottom of a prismatic package including lateral compound walls and a bottom constituted by a V-shaped element 53 of thermoplastic material. The surfaces 54 of the complex material are provided with lines of fold at 55 allowing the deformation of the package into parallelopipedic shape while the welds 56 between the cooperating edges of the compound walls may be folded outwardly so as to close the ends of the V-shaped element 53. The essential feature of this latter embodiment consists in that the free edges of the V-shaped element are positioned at a distance from the lateral edges of the compound surfaces which is sufficient to allow the formation of flaps 57 through a cutting of the lines of fold 55 on the outside of the V-shaped element.

Obviously, the above embodiments of my invention are adapted to be modified to a considerable extent as may be required, within the scope of the accompanying claims.

What I claim is:
1. A method for producing accordion-shaped bags and the like articles, comprising two flat walls and collapsible lateral walls connecting the latter with each other, consisting in laying between two films of compound material having a thermo-weldable surface facing the other film and adapted to form the first mentioned walls, a plurality of parallel sheaths of thermo-weldable material having two superposed walls, inserting inside said sheaths in registry with at least the central section thereof a narrow strip of non thermo-weldable material, welding simultaneously the films to the medial longitudinal sections of the cooperating sheath surfaces and cutting the films, sheaths and strips approximately along the medial longitudinal line of said medial sections and removing the insert strips.

2. A method for producing accordion-shaped bags and the like articles, comprising two flat walls and collapsible lateral walls connecting the latter with each other, consisting in forming sheaths having superposed surfaces by welding together the corresponding edges of two superposed strips of thermo-weldable material, laying between two films having thermo-weldable surfaces and adapted to form the first mentioned walls said sheaths in spaced parallel relationship, inserting inside said sheaths in registry with at least the central section thereof a narrow strip of non thermo-weldable material, welding simultaneously the films to the medial longitudinal sections of the cooperating sheath surfaces and cutting the films, sheaths and strips approximately along the medial longitudinal line of said medial sections and removing the insert strips.

3. A method for producing accordion-shaped bags and the like articles, comprising two flat walls and collapsible lateral walls connecting the latter with each other, consisting in laying between two films having thermo-weldable surfaces and adapted to form the first mentioned walls a plurality of parallel extruded unwelded sheaths of thermo-weldable material, inserting inside sheaths in registry with at least the central section thereof a narrow strip of non thermo-weldable material, welding simultaneously the films to the medial longitudinal sections of the cooperating sheath surfaces and cutting the films, sheaths and strips approximately along the medial longitudinal line of said medial sections and removing the insert strips.

4. A method for producing accordion-shaped bags and the like articles, comprising two flat walls and collapsible lateral walls connecting the latter with each other, consisting in laying between two films of compound material having a thermo-weldable surface facing the other film and adapted to form the first-mentioned walls, a plurality of parallel sheaths of thermo-weldable material having two superposed walls, inserting inside said sheaths in registry with at least the central section thereof a narrow strip of non thermo-weldable material, folding the thermo-plastic surface of each compound material wall over the corresponding free edge of the thermo-weldable folded element and welding both sides of said free edge with the cooperating surfaces of the edge of the folded element.

5. A method for producing collapsible bellow-shaped articles, comprising two flat, non-collapsible walls and collapsible lateral walls connecting the latter with each other, consisting in laying between two films of thermo-weldable material adapted to form the flat walls of the bellows, a plurality of parallel sheaths of thermo-weldable material having two superposed walls, inserting inside each sheath in registry with at least the medial longitudinal section thereof a narrow strip of non-thermo-weldable material, welding simultaneously the films to the medial longitudinal sections of the cooperating sheath surfaces, cutting the films, sheaths and strips approximately along the planes of symmetry of said strips and removing the insert strips.

6. A method for producing collapsible bellow-shaped articles, comprising two flat, non-collapsible walls and collapsible lateral walls connecting the latter with each other, consisting in laying between two films of thermo-weldable material adapted to form the flat walls of the bellows, a plurality of parallel sheaths of thermo-weldable material having two superposed walls, inserting inside each sheath in registry with at least the medial longitudinal section thereof a narrow strip of non-thermo-weldable material, welding the film sheath and strip assembly along two lines parallel to either side of the longitudinal line of symmetry of each sheath, cutting the films, sheaths and strips approximately along the planes of symmetry of said strips and removing the insert strips and welding together the free edges of the sheaths and films along their lines of cut.

References Cited in the file of this patent

UNITED STATES PATENTS

| | | |
|---|---|---|
| 1,868,069 | Munson | July 19, 1932 |
| 2,197,112 | Piazze | Apr. 16, 1940 |
| 2,265,075 | Knuetter | Dec. 2, 1941 |
| 2,312,280 | Avery | Feb. 23, 1943 |
| 2,333,330 | Moore | Nov. 2, 1943 |
| 2,353,178 | Moore | July 11, 1944 |
| 2,385,646 | Poppe | Sept. 25, 1945 |
| 2,440,664 | Iron | Apr. 27, 1948 |
| 2,633,286 | Claridge | Mar. 31, 1953 |
| 2,815,063 | La Fleur | Dec. 3, 1957 |